(12) United States Patent
Nero, Jr.

(10) Patent No.: US 6,531,879 B1
(45) Date of Patent: Mar. 11, 2003

(54) METHOD AND APPARATUS FOR DELAY-LINE TIME-DOMAIN REFLECTOMETRY

(75) Inventor: Regis J. Nero, Jr., Export, PA (US)

(73) Assignee: Tollgrade Communications, Inc., Wilmington, DE (US)

(*) Notice: Subject to any disclaimer, the term of this patent is extended or adjusted under 35 U.S.C. 154(b) by 66 days.

(21) Appl. No.: 09/868,482

(22) PCT Filed: Oct. 27, 2000

(86) PCT No.: PCT/US00/41691

§ 371 (c)(1),
(2), (4) Date: Jun. 18, 2001

(87) PCT Pub. No.: WO01/31890

PCT Pub. Date: May 3, 2001

Related U.S. Application Data

(60) Provisional application No. 60/162,092, filed on Oct. 28, 1999.

(51) Int. Cl.[7] .............................................. G01R 31/11
(52) U.S. Cl. ...................................... 324/534; 379/1.04
(58) Field of Search ................................ 324/527, 528, 324/532, 533, 534, 535, 536, 676, 678, 618, 629, 639, 637, 642; 379/1.03, 1.04, 15.03, 22.03, 22.04, 29.03, 29.04, 30

(56) References Cited

U.S. PATENT DOCUMENTS

| | | | |
|---|---|---|---|
| 2,800,627 A | 7/1957 | Oudin et al. | 324/52 |
| 3,683,282 A | 8/1972 | D'Amato et al. | 325/363 |
| 3,715,511 A | * 2/1973 | Shaffer | 179/16 E |
| 4,109,117 A | 8/1978 | Wrench, Jr. et al. | 179/175.3 F |
| 4,165,482 A | 8/1979 | Gale | 324/52 |
| 4,322,677 A | 3/1982 | Wright | 324/52 |
| 4,325,022 A | 4/1982 | Pelletier | 324/52 |
| 4,518,911 A | 5/1985 | Cass | 324/52 |
| 4,538,103 A | 8/1985 | Cappon | 324/52 |

(List continued on next page.)

Primary Examiner—N. Le
Assistant Examiner—Etienne P LeRoux
(74) Attorney, Agent, or Firm—Webb Ziesenheim Logsdon Orkin & Hanson, P.C.

(57) ABSTRACT

An apparatus for testing a telephone line (12) includes a charge generator (4) for selectively charging a line capacitor (16) formed by the physical relation of at least two electrically conductive leads (8, 10) of the telephone line (12) to a predetermined DC voltage. A line clamp (6) selectively connects the leads (8, 10) together and a return detector (18) receives a discharge pulse (22) produced by discharge of the line capacitor (16) in response to the line clamp (6) connecting the leads (8, 10) together. The return detector (18) detects an end-of-line pulse (28) and/or a bridged-tap pulse (32) superimposed on the discharge pulse (22) and outputs an analog return signal as a function thereof.

17 Claims, 7 Drawing Sheets

U.S. PATENT DOCUMENTS

| | | |
|---|---|---|
| 4,639,557 A | 1/1987 | Butler et al. .................. 379/29 |
| 4,649,335 A | 3/1987 | Lassaux et al. ............... 324/52 |
| 4,739,276 A | 4/1988 | Graube ....................... 324/534 |
| 4,766,386 A | 8/1988 | Oliver et al. ............... 324/533 |
| 4,766,549 A | 8/1988 | Schweitzer, III et al. ... 364/481 |
| 4,768,203 A | 8/1988 | Ingle ............................ 375/10 |
| 4,859,951 A | 8/1989 | Cole et al. .................. 324/534 |
| 4,866,685 A | 9/1989 | Lee ............................ 368/117 |
| 5,083,086 A | 1/1992 | Steiner ....................... 324/533 |
| 5,121,420 A | 6/1992 | Marr et al. ................... 379/26 |
| 5,128,619 A | 7/1992 | Bjork et al. ................. 324/533 |
| 5,321,632 A | 6/1994 | Otsuji et al. ................ 364/562 |
| 5,352,984 A | 10/1994 | Piesinger .................... 324/532 |
| 5,369,366 A | 11/1994 | Piesinger .................... 324/533 |
| 5,376,888 A | 12/1994 | Hook .......................... 324/643 |
| 5,381,348 A | 1/1995 | Ernst et al. ................. 364/514 |
| 5,440,528 A | 8/1995 | Walsh ........................ 368/113 |
| 5,461,318 A | 10/1995 | Borchert et al. ............ 324/533 |
| 5,491,574 A | 2/1996 | Shipley ....................... 359/110 |
| 5,500,731 A | 3/1996 | Sato et al. ................. 356/73.1 |
| 5,504,810 A | 4/1996 | McNair ....................... 379/189 |
| 5,514,965 A | 5/1996 | Westwood .................. 324/533 |
| 5,519,327 A * | 5/1996 | Consiglio ................... 324/678 |
| 5,521,512 A | 5/1996 | Hulina ........................ 324/533 |
| 5,530,365 A | 6/1996 | Lefeldt ....................... 324/536 |
| 5,530,367 A | 6/1996 | Bottman ..................... 324/616 |
| 5,532,603 A | 7/1996 | Bottman ..................... 324/628 |
| 5,543,912 A | 8/1996 | Kada et al. ................. 356/73.1 |
| 5,570,029 A | 10/1996 | Bottman et al. ............ 324/628 |
| 5,578,917 A | 11/1996 | Bottman .................. 324/76.15 |
| 5,586,054 A | 12/1996 | Jensen et al. ........... 364/514 B |
| 5,606,592 A * | 2/1997 | Galloway et al. .............. 379/30 |
| 5,650,728 A | 7/1997 | Rhein et al. ................ 324/543 |
| 6,026,145 A | 2/2000 | Bauer et al. .................. 379/26 |
| 6,177,801 B1 | 1/2001 | Chong ........................ 324/520 |

* cited by examiner

METHOD AND APPARATUS FOR DELAY-LINE TIME-DOMAIN REFLECTOMETRY

This application claims benefit of provisional application No. 60/162,092 filed Oct. 28, 1999.

BACKGROUND OF THE INVENTION

1. Field of the Invention

This invention relates to testing of telephone lines using time-domain, reflectometry.

2. Description of the Prior Art

A typical telephone subscriber receives telephony services over a pair of copper wires at frequencies below 4 kHz. Recent transmission technology, such as digital subscriber line (DSL), has expanded the possible use of copper wires to enable high speed data transmissions using frequencies up to and beyond 1 MHz. However, installation practices and defects or anomalies in copper wire pairs can limit or distort the transmission carrying capacity thereof. To test for possible problems in copper wire pairs, a single-ended test is desired to avoid or minimize the time and expense of dispatching repair personnel to the far end of a copper wire pair for a dual-ended test.

Time-domain reflectometry (TDR) is a well-known and generally available technique that can be utilized to identify problems associated with copper wire pairs. TDR apparatus and methods are disclosed generally in U.S. Pat. No. 5,121,420 to Marr et al.; U.S. Pat. No. 5,369,366 to Piesinger; 5,461,318 to Borchert et al.; 5,521,512 to Hulina; 5,530,365 to Lefeldt; and 5,650,728 to Rhein et al. However, traditional TDR techniques have several limitations. Specifically, present TDR techniques include transmitting an electrical pulse down the copper wire pair and measuring the time to receive a return pulse. This return pulse occurs when the transmitted pulse encounters a change in impedance of the copper wire pair due to some discontinuity therein. Common causes of discontinuities in the copper wire pair include: splices where different copper wire pairs are joined together; moisture on or around the copper wire pair; connection of bridge taps to the copper wire pair; or terminations, such as telephones, that may be connected to the copper wire pair.

Conventional TDR is limited by the energy content of the pulse and the frequency dispersion of the pulse as it travels along the length of the copper wire pair and back. These limitations include: technical difficulty in coupling all of the source TDR energy pulse to the copper wire pair; very low return signal levels due to losses associated with round trip pulse transmission along the copper wire pair; "smearing" of return pulses due to multiple reflections in both directions of pulse travel and a low signal-to-noise ratio (SNR) on a lossy copper wire pair.

It is, therefore, an object of the present invention to provide a method of performing time-domain reflectometry that avoids the above problems and others associated with conventional TDR techniques. It is an object of the present invention to provide an apparatus for performing the method. Still other objects of the present invention will become apparent to those of ordinary skill in the art upon reading and understanding the following detailed description.

SUMMARY OF THE INVENTION

Accordingly, I have invented a delay-line time-domain reflectometer that includes a charge generator for selectively charging a line capacitor formed by the physical relation of at least two electrically conductive leads to a predetermined DC voltage. A line clamp selectively connects the leads together and a return detector receives a discharge pulse produced by discharge of the line capacitor in response to the line clamp connecting the leads together. The return detector also detects an end-of-line (EOL) pulse and/or a bridged-tap (BT) pulse superimposed on the discharge pulse and outputs an analog return signal that is a function of the discharge pulse, the EOL pulse and/or the BT pulse. The EOL pulse is produced by interaction between the discharge pulse and a terminal end of the leads and the BT pulse is produced by interaction between the discharge pulse and a BT connected to the leads.

Preferably, the charge generator charges the line capacitor as a function of the length of the conductive leads. More specifically, the charge generator charges the line capacitor as a function of the section of the length of the conductive leads being tested. For example, the charge generator charges the line capacitor to a first voltage which produces for a first section of the conductive leads a discharge pulse having an EOL pulse and/or a BT pulse superimposed thereon having sufficient signal-to-noise ratio (SNR) to enable detection thereof by the return detector. For testing a second section of the line, the charge generator charges the line capacitor to a second voltage which produces a discharge pulse having an EOL pulse and/or a BT pulse superimposed thereon having sufficient SNR to enable detection thereof by the return detector. Similar comments apply in respect of other voltages utilized for testing other sections of the conductive leads.

A charging resistor can be included for limiting a charging current utilized to charge the line capacitor and isolated the charge generator from the line capacitor when the line clamp connects the leads together.

A controller can selectively control the operation of the charge generator and the line clamp to charge the line capacitor to a predetermined DC voltage and to connect the leads together, respectively. The controller can also process the analog return signal to determine a distance between the delay-line time-domain reflectometer and a terminal end of the leads, a distance between the delay-line time-domain reflectometer a BT and/or a distance between the terminal end of the BT and its connection to the leads.

A digital-to-analog converter (DAC) can be connected to receive and convert digital waveform data into an analog signal which is supplied to the charge generator for use thereby to charge the line capacitor. An analog-to-digital converter (ADC) can convert the analog return signal into digital return data. The controller can supply the digital waveform data to the DAC and can receive the digital return data from the ADC.

The controller can include a programmable logic device (PLD) responsive to a control request signal for supplying the digital waveform data to the DAC and for generating one or more control signals which control the operation of the DAC and the ADC. A digital signal processor (DSP) can be connected for supplying the control request signal to the PLD and for receiving the digital return data from the ADC. A host processor can supply a test request to the DSP and can receive therefrom a test result which is a function of the digital return data.

A rail supply can be connected to receive DC power from an external source thereof and to convert the received DC power into one or more electrical potentials for use by the return detector. Preferably, the rail supply is configured to isolate the return detector from the external source of DC power during receipt of the discharge pulse by the return detector.

I have also invented a method of time-domain reflectometry comprising the steps of charging a line capacitor formed by the physical relation of electrically conductive leads of a telephone line to a predetermined DC voltage. The leads are connected together and a discharge pulse produced by discharge of the line capacitor in response to connecting the leads together can be received. An EOL pulse and/or a BT pulse superimposed on the discharge pulse can be detected. The EOL pulse is produced by interaction between the discharge pulse and a terminal end of the leads and a BT pulse is produced by interaction between the discharge pulse and a BT connected to the leads. From the discharge pulse, the EOL pulse and/or the BT pulse, a location of a terminal end of the leads, a location of the BT connection to the leads and/or a location of a terminal end of the BT relative to its connection to the leads can be determined.

Lastly, I have invented an apparatus for testing a telephone line. The apparatus includes a charge generator for charging the telephone line to a predetermined DC voltage. A switch is provided for connecting together leads of the telephone line when the telephone line is charged to the predetermined DC voltage. A return detector processes a discharge pulse on the telephone line to produce a return signal. The discharge pulse is produced in response to connecting the leads of the telephone line together when the line capacitor is charged to the predetermined DC voltage. A means for processing is provided for processing the return signal to determine one or more characteristics of the telephone line.

The means for processing can include a first converter for converting the return signal into return data and a controller for processing the return data to determine the one or more characteristics of the telephone line. The controller synchronizes the operation of the charge generator and the switch to charge the line capacitor and to connect the leads together, respectively. A second converter can be provided for converting waveform data into a signal which is utilized to control the charge generator to charge the telephone line. The controller can supply the waveform data to the second converter.

DETAILED DESCRIPTION OF THE PREFERRED EMBODIMENT

The present invention will be described with reference to detection of the position of bridge taps on a telephone line and the detection of the length of the telephone line. However, the invention is not to be construed as so limited.

Figure 1A:
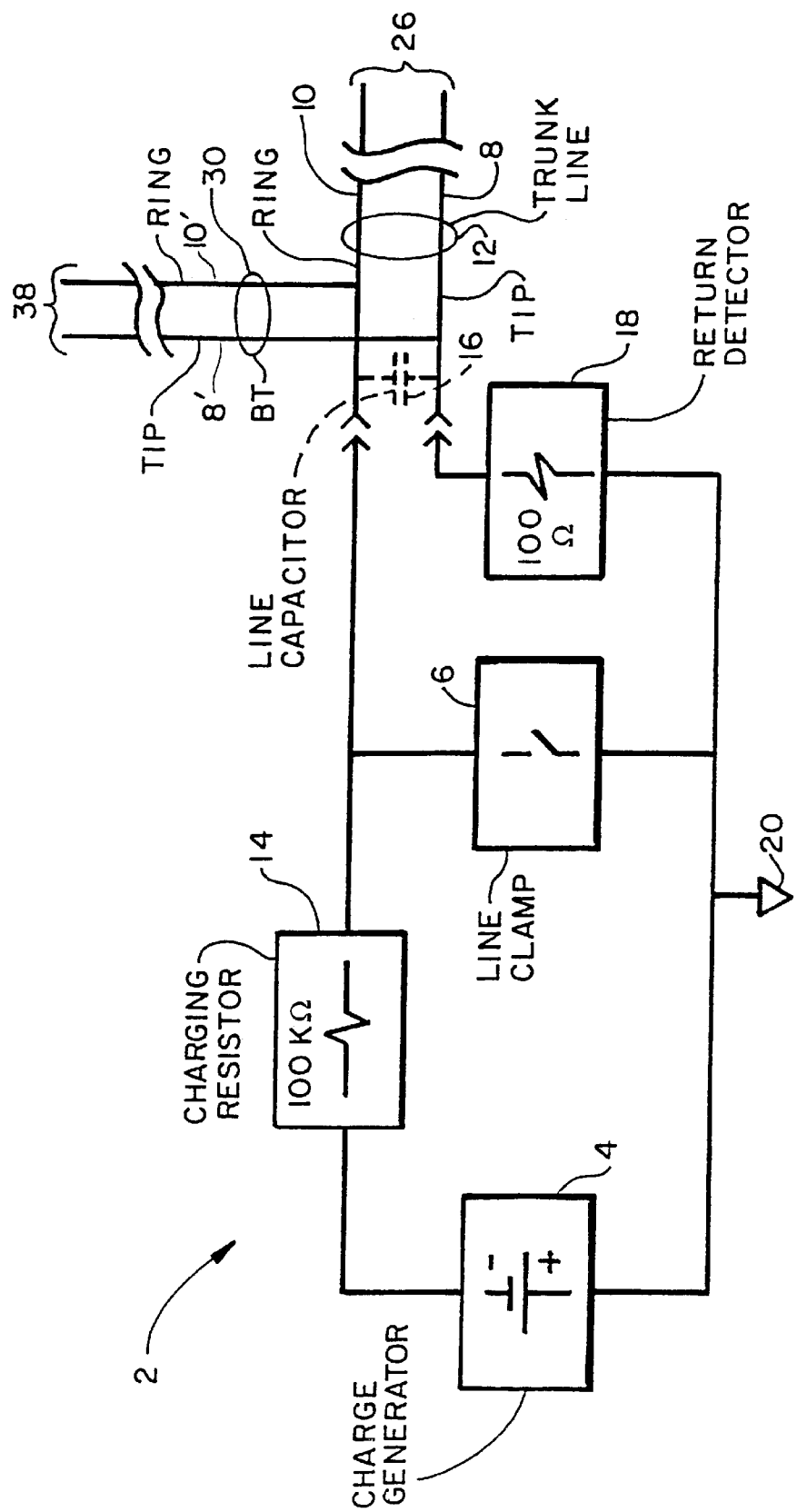
FIG. 1A is a generalized schematic drawing of a delay-line time-domain reflectometer (DLTDR) in accordance with the present invention connected to a copper wire pair.

With reference to FIG. 1A, a delay-line time-domain reflectometer (DLTDR) 2 in accordance with the present invention essentially includes a charge generator 4 and a line clamp 6 connected in parallel between a TIP lead 8 and a RING lead 10 of a telephone line 12, hereinafter referred to as a "trunk line". It is well-known in the art that a conventional telephone line, such as trunk line 12, has a capacitance and/or resistance per unit length that are controlled during manufacture of the telephone line to ensure compatibility with existing telephony equipment to be connected thereto.

A charging resistor 14, preferably having a value of 100K ohmns, is connected between the charge generator 4 and TP lead 8 or RING lead 10 of trunk line 12 to limit the charging current that is utilized to charge a line capacitor 16 formed by the physical relation of TIP lead 8 and RING lead 10 of trunk line 12. For purposes of illustration, line capacitor 16 formed by TIP lead 8 and RING lead 10 of trunk line 12 is shown in phantom in FIG. 1A. A return detector 18, preferably having a 100 ohm input resistance, is connected between line clamp 6 and the other of TIP lead 8 or RING lead 10 of trunk line 12. Return detector 18 detects the response of trunk line 12 in a manner to be described hereinafter in greater detail.

In operation, charge generator 4 charges line capacitor 16 to a desired DC voltage through charging resistor 14. Preferably, TIP lead 8 is connected to an isolated ground 20 via return detector 18 and RING lead 10 is charged to a negative voltage relative to the potential of TIP lead 8. However, this is not to be construed as limiting the invention.

Figure 1B:
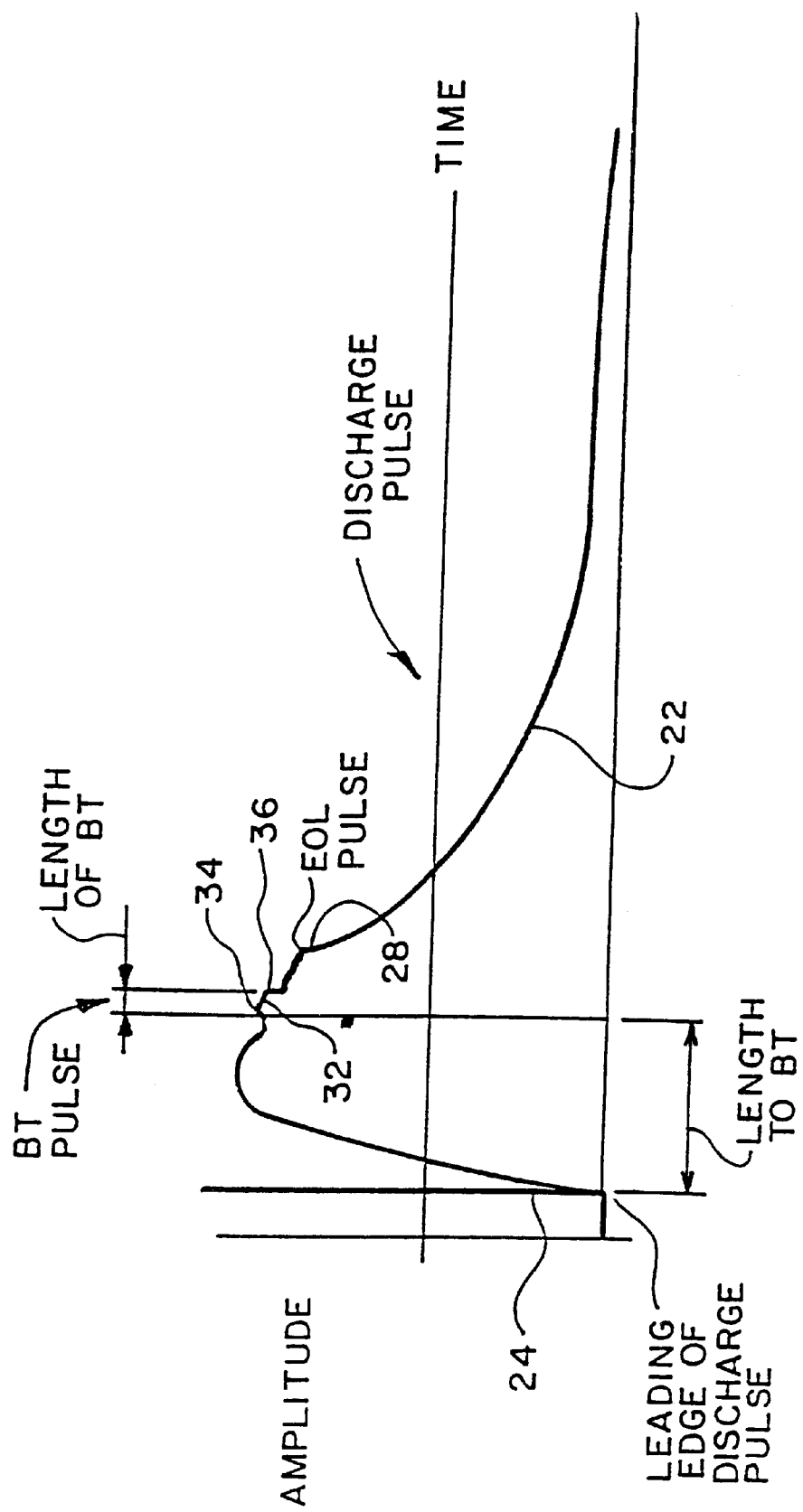
FIG. 1B is a graph of amplitude vs. time of a discharge pulse generated by operation of the DLTDR in FIG. 1A.

With reference to FIG. 1B, and with continuing reference to FIG. 1A, when line capacitor 16 is charged to a desired DC voltage, line clamp 6 connects TIP lead 8 and RING lead 10 together thereby causing line capacitor 16 to discharge through the 100 ohm input resistance of return detector 18. This discharge generates across return detector 18 a discharge pulse 22 that ideally has a leading edge, a trailing edge and a constant amplitude therebetween. However, as shown in FIG. 1B, in actuality discharge pulse 22 has a leading edge 24 and an amplitude that decreases exponentially to the potential of isolated ground 20 due to the exponential discharge of the charge stored in line capacitor 16.

Interaction between discharge pulse 22 and a terminal end 26 of trunk line 12 opposite the DLTDR 2 generates an end-of-line (EOL) pulse 28 that is superimposed on discharge pulse 22. The interval between leading edge 24 of discharge pulse 22 and EOL pulse 28 corresponds to a distance between DLTDR 2 and terminal end 26 of trunk line 12. It has been empirically determined that the duration between leading edge 24 of discharge pulse 22 and EOL pulse 28 corresponds to two times the distance between DLTDR 2 and terminal end 26 of trunk line 12. Stated differently, the duration between leading edge 24 of discharge pulse 22 and EOL pulse 28 corresponds to two times the transmission delay of trunk line 12.

Since EOL pulse 28 propagates along trunk line 12, the amplitude of EOL pulse 28 sensed by return detector 18 is reduced due to interaction of EOL pulse 28 with the resistance of the conductor(s) forming TIP lead 8 and/or RING lead 10 of trunk line 12. More specifically, the amplitude of EOL pulse 28 is inversely proportional to the length of trunk line 12. Hence, EOL pulse 28 has a greater amplitude for a short trunk line and a lesser amplitude for a long trunk line.

For very long trunk lines, e.g., 18,000 feet, it has been empirically determined that the amplitude of EOL pulse 28 sensed by return detector 18 can be as low as 1 mV.

As shown in FIG. 1A, TIP lead 8' and RING lead 10' of one or more telephone lines 30 can be bridge connected to TIP lead 8 and RING lead 10 of trunk line 12. Each telephone line 30 bridge connected to trunk line 12 is hereinafter referred to as a "bridged-tap" (BT) 30. In response to discharge pulse 22, any BT 30 connected to trunk line 12 will generate a BT pulse 32 superimposed on discharge pulse 22 at a time corresponding to the position of BT 30 on trunk line 12. More specifically; the interval detected by return detector 18 between leading edge 24 of discharge pulse 22 and a leading edge 34 of BT pulse 32 corresponds to the distance between DLTDR 2 and the corresponding BT 30. Moreover, the interval detected by return detector 18 between leading edge 34 and a trailing edge 36 of the same BT pulse 32 corresponds to the distance between trunk line 12 and a terminal end 38 of BT 30.

Importantly, discharge pulse 22 decays at a substantially lower frequency than the frequencies associated with leading edge 24 of discharge pulse 22, EOL pulse 28 and/or BT pulse 32. In order to avoid detecting the frequency associated with the decay of discharge pulse 22, return detector 18 is preferably configured to reject frequencies associated therewith and to detect frequencies associated with leading edge 24 of discharge pulse 22, EOL pulse 28 and/or BT pulse 32.

Charge generator 4 is configured to vary the voltage to which line capacitor 16 is charged to optimize the amplitude of EOL pulse 28 and/or BT pulse 32 for detection by return detector 18. Specifically, a short trunk line 12 can be charged to a lower voltage than a long trunk line 12 for a given amplitude of EOL pulse 28 and/or BT pulse 32.

Figure 2:
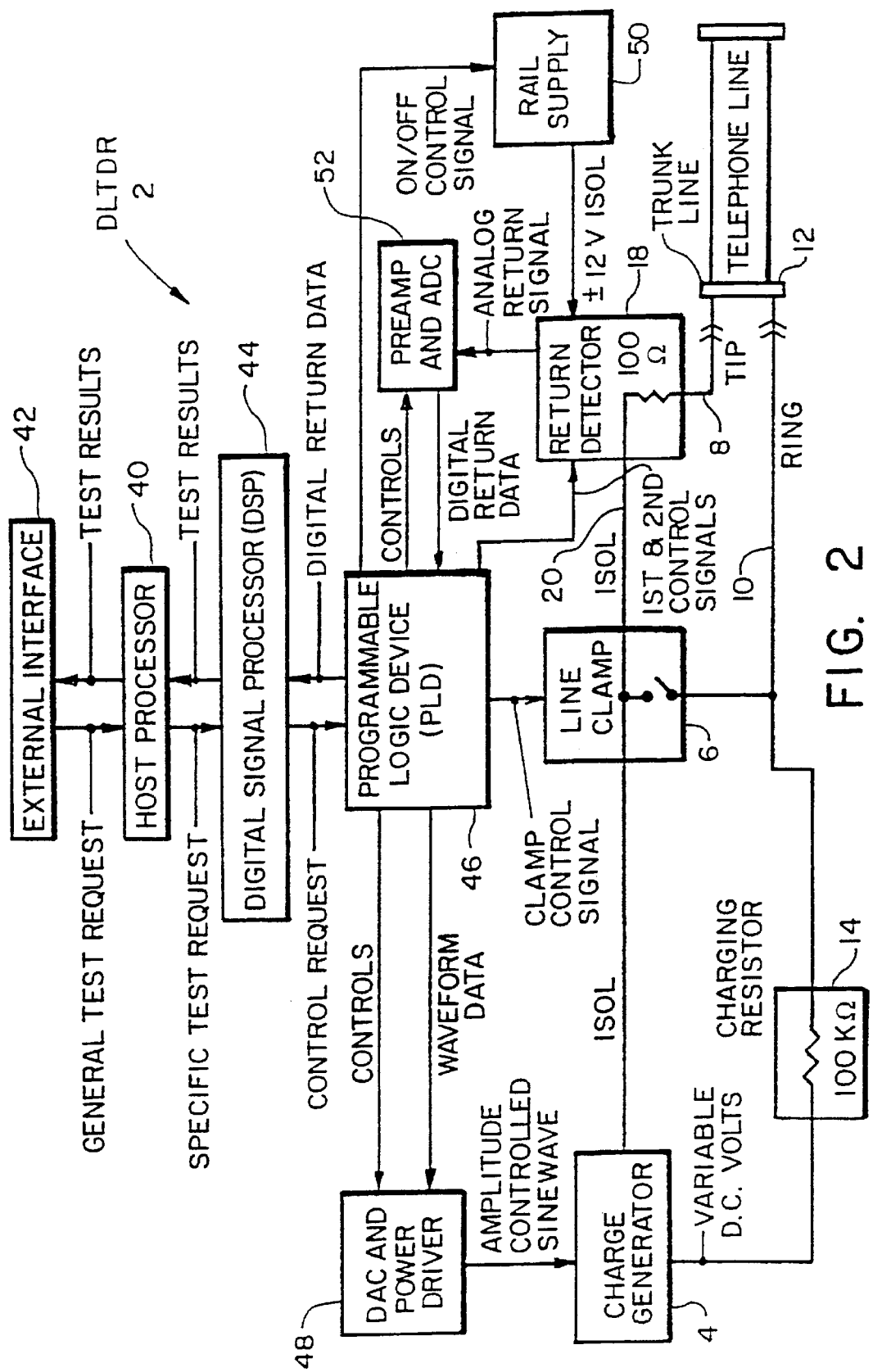
FIG. 2 is a detailed schematic drawing of the DLTDR in FIG. 1A.

With reference to FIG. 2, DLTDR 2 includes a host processor 40 which communicates with an external controller (not shown) via an external interface 42 which is configured to support communication between the external controller and host processor 40. A digital signal processor (DSP) 44 is connected to host processor 40. DSP 44 is configured to implement a test of trunk line 12 in response to receiving a test request from host processor 40 and to return test results to host processor 40. When the test of trunk line 12 is complete, host processor 40 receives results of the test from DSP 44 and communicates the test results to the external controller via external interface 42. A typical test includes detecting the location of BT 30 on trunk line 12, detecting the length of trunk line 12 and/or detecting the length of BT 30.

Preferably, host processor 40 is a microprocessor that is programmed to control the overall operation of DLTDR 2, such as coordinating the operation of DSP 44, and to perform time intensive routines required for external communication via external interface 42. DSP 44 preferably manages high level tasks associated with operation of DLTDR 2. These high level tasks include issuing hardware control requests to a programmable logic device (PLD) 46, signal processing of digital return data from PLD 46 and implementing algorithms, such as neural network algorithms, to identify the location of BT 30 on trunk line 12, the length of trunk line 12 and/or the length of BT 30 connected thereto.

The neural network algorithms perform pattern matching on the processed digital return data based upon known characteristics gathered from training data obtained from test trunk lines (not shown) having known lengths and test BTs (not shown) having known lengths that are connected to the test trunk lines at known locations. The neural network algorithms enable DSP 44 to determine the length of trunk line 12, the location of BTs 30 connected to trunk line 12 and the length of BTs 30 connected to trunk line 12 by matching the return signals from trunk lines 12 and/or BTs 30 having unknown characteristics with return signals from test trunk lines and/or test BTs having known characteristics.

PLD 46 accepts control requests from DSP 44 and manages the operation of hardware that performs low-level signal generation and conversion. This hardware includes a DAC/PWR driver 48, charge generator 4, line clamp 6, return detector 18, a rail supply 50 and a PREAMP/ADC 52. Essentially, PLD 46 is an interface between DSP 44 and this hardware.

Under the control of PLD 46, DACIPWR driver 48 preferably generates a 1 MHz sine wave for charging line capacitor 16. PLD 46 controls the amplitude of the sine wave produced by DAC/PWR driver 48 to control the voltage to which line capacitor 16 is charged.

Figure 3A:
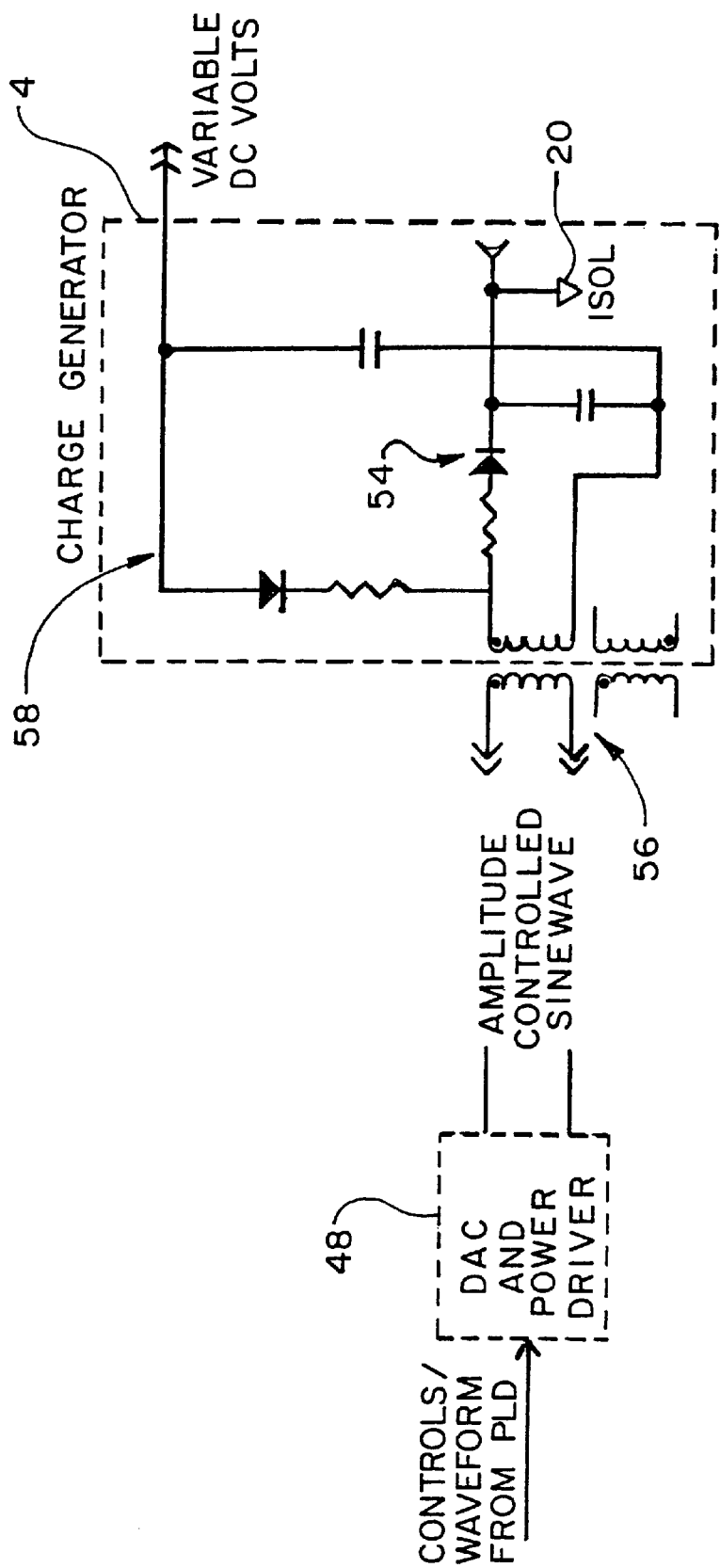
FIG. 3A is a detailed electrical schematic of the charge generator of FIG. 2 connected to receive an amplitude controlled sine wave from the DAC and power driver.

With reference to FIG. 3A, and with continuing reference to FIG. 2, charge generator 4 includes a rectifier 54 which rectifies the sine wave produced by DAC/PWR driver 48 to produce a DC voltage for charging line capacitor 16. Charge generator 4 also includes a step-up transformer 56 which isolates line capacitor 16 from earth ground and a voltage doubler 58.

Charging resistor 14 preferably has a value of 100 K ohms for limiting current to line capacitor 16 during charging and operation of line clamp 6. The resistance of charging resistor 14 essentially isolates charge generator 4 from line capacitor 16 when line clamp 6 connects together TIP lead 8 and RING lead 10 of trunk line 12.

Charge generator 4 applies to line capacitor 16, preferably RING lead 10, a selected voltage based on the length of trunk line 12 to be tested. Examples of typical voltages for corresponding lengths of trunk line 12 include:

| Voltage | Length of Trunk Line (1000 feet) |
| --- | --- |
| −13.2V | 0 to 7 |
| −54.2V | 6 to 12 |
| −138V | 10 to 20 |

Once line capacitor 16 is charged to a desired level by charge generator 4, PLD 46 supplies a clamp control signal to line clamp 6. In response to receiving the clamp control signal, line clamp 6 connects TIP lead 8 and RING lead 10 of trunk line 12 together through return detector 18. Connecting together TIP lead 8 and RING lead 10 of trunkline 12 initiates discharge pulse 22 having EOL pulse 28 and/or BT pulse 32 superimposed thereon. PLD 46 maintains the clamp control signal to line clamp 6 until EOL pulse 28 and/or BT pulse 32 are received by return detector 18. Thereafter, PLD 46 removes the clamp control signal thereby causing line clamp 6 to isolate TIP lead 8 and RING lead 10.

Figure 3B:
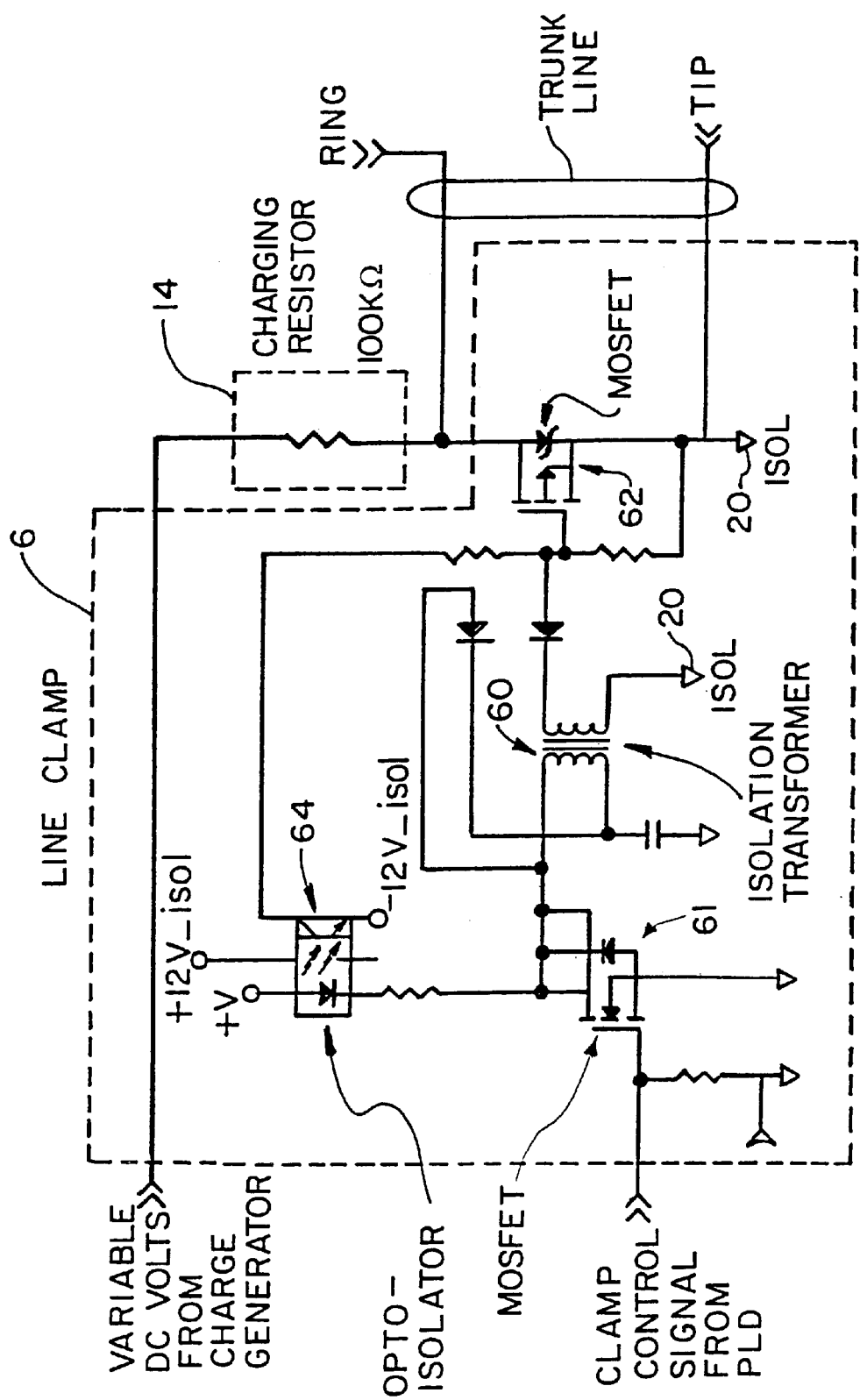
FIG. 3B is a detailed electrical schematic of the line clamp of FIG. 2.

As shown in FIG. 3B, line clamp 6 includes an isolation transformer 60 which DC isolates line clamp 6 and return detector 18 from PLD 46, DSP 44 and host processor 40. Isolation transformer 60 enables line clamp 6 and return detector 18 to "float" electrically relative to PLD 46, DSP 44 and host processor 40 and avoids line clamp 6 and return detector 18 from being affected by common mode voltages, such as 60 Hz, induced from power lines or AM radio signals.

In response to receiving a leading edge of the clamp control signal from PLD 46 via a MOSFET 61, isolation transformer 60 supplies a rapid turn-on pulse to MOSFET 62 in series with charging resistor 14. Preferably, isolation transformer 60 produces the turn-on pulse within 25 nanoseconds of receiving the clamp control signal. In response to receiving the turn-on pulse, MOSFET 62 connects together TIP lead 8 and RING lead 10 of trunk line 12.

Line clamp 6 also includes an opto-isolator 64 which is responsive to the clamp control signal. In response to MOSFET 61 receiving the clamp control signal having a sufficient DC level to cause a trigger thereof, opto-isolator 64 supplies to MOSFET 62 in series with charging resistor 14 a DC turn-on signal. Opto-isolator 64 has a slower response to the clamp control signal than isolation transformer 60. However, opto-isolator 64 is configured so that MOSFET 62 receives the DC turn-on signal before the turn-on pulse from isolation transformer 60 decays. Hence, the turn-on pulse from isolated transformer 60 initiates MOSFET 62 connecting together TIP lead 8 and RING lead 10 and the DC turn-on signal from opto-isolator 64 maintains MOSFET 62 in conduction thereby maintaining TIP lead 8 and RING lead 10 connected together during acquisition of EOL pulse 28 and/or BT pulse 32.

Figure 3C:
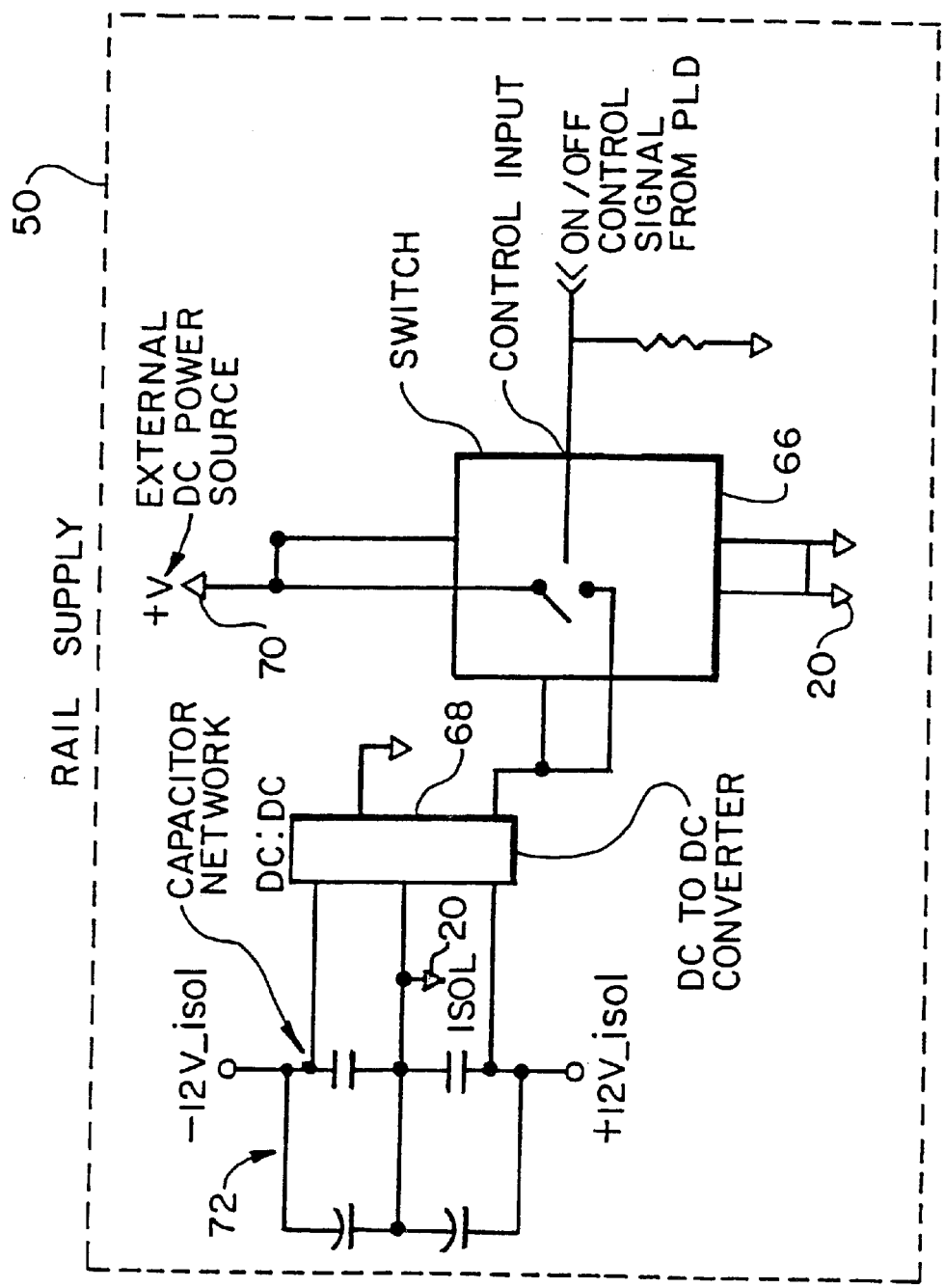
FIG. 3C is a detailed electrical schematic of the rail supply of FIG. 2.

With reference to FIG. 3C, and with continuing reference to FIG. 2, rail supply 50 includes a switch 66 having a control input connected to receive an ON/OFF control signal from PLD 46, a DC-to-DC converter 68 connectable to a source of external DC power 70 via switch 66 and a network of capacitors 72 connected to DC-to-DC converter 68. Absent receiving the ON/OFF control signal from PLD 46, switch 66 of rail supply 50 connects DC-to-DC converter 68 to the source of external DC power 70. DC-to-DC converter 68 charges the capacitor network 72 to ±12 volts relative to isolated ground 20. The ±12 volts and isolated ground 20 are utilized to supply power to return detector 18, shown in greater detail in FIG. 3D.

In operation, PLD 46 supplies the ON/OFF control signal to switch 66 of rail supply 50 just before supplying the clamp control signal to line clamp 6. In response to receiving the ON/OFF control signal, switch 66 of rail supply 50 isolates DC-to-DC converter 68 from the source of external DC power 70. When DC-to-DC converter 68 is isolated from the source of external DC power 70, return detector 18 derives its operating power from capacitor network 72 of rail supply 50. Capacitor network 72 of rail supply 50 is configured to supply operating DC power to return detector 18 during acquisition of EOL pulse 28 and/or BT pulse 32. DC-to-DC converter 68 is isolated from the source of external DC power 70 to avoid electrical noise from the source of external DC power 70 from affecting the operation of return detector 18.

Figure 3D:
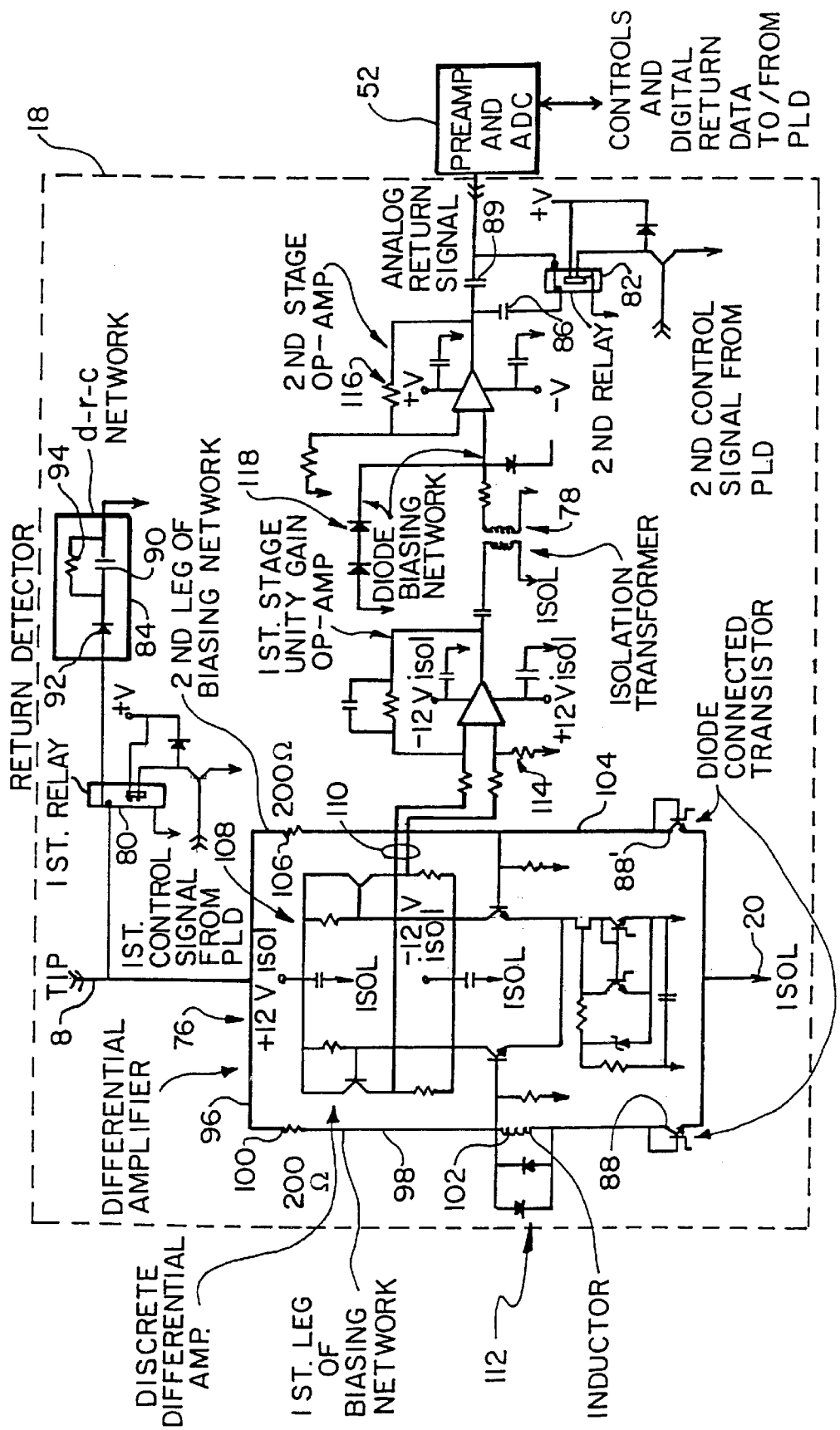
FIG. 3D is a detailed electrical schematic of the return detector of FIG. 2.

With reference to FIG. 3D, and with continuing reference to FIG. 2, return detector 18 provides a 100 ohm characteristic telephone line impedance to trunk line 12 and provides signal processing for detecting leading edge 24 of discharge pulse 22, EOL pulse 28 and/or BT pulse 32. Return detector 18 utilizes a differential amplifier 76 for detecting leading edge 24 of discharge pulse 22, EOL pulse 28 and/or BT pulse 32 superimposed on discharge pulse 22. Return detector 18 also provides an analog return signal to PREAMP/ADC 52 via an isolation transformer 78.

More specifically, return detector 18 includes a first relay 80 and a second relay 82 connected to receive a respective first control signal and a second control signal from PLD 46. First relay 80 connects a DRC network 84 to UP lead 8 in response to receiving the first control signal. Second relay 82 connects a capacitor 86 to an input of PREAMP/ADC 52 in response to receiving the second control signal. DRC network 84 is connectable to TIP lead 8 and capacitor 86 is connectable to the input of PREAMP/ADC 52 to adapt the overall response of return detector 18 as a function of the voltage applied to line capacitor 16. Specifically, first relay 80 selectively connects the DRC network 84 to TIP lead 8 to limit peak current through diode-connected transistors 88 and 88' of differential amplifier 76. Second relay 82 selectively connects capacitor 86 in parallel with capacitor 89 to form with the input/output resistance of PREAMP/ADC 52 a filter network responsive to the analog return signal received from differential amplifier 76.

In operation, in response to receiving the clamp control signal, line clamp 6 connects together TIP lead 8 and RING lead 10 through return detector 18 thereby causing line capacitor 16 to discharge. This discharge causes the voltage of TIP lead 8 to change rapidly to about 25% of the value to which line capacitor 16 was charged. For example, if RING lead 10 is charged to a voltage of −138 volts, in response to line clamp 6 connecting together TIP lead 8 and RING lead 10, the voltage of TIP lead 8 increases to about −35 volts in about 10 microseconds.

Preferably, DRC network 84 is connected to TIP lead 8 via first relay 80 to limit the peak voltage on TIP lead 8 and to reduce the rise time of the voltage increase on TIP lead 8. In this respect, DRC network 84 shunts current when the TIP voltage is increasing. Specifically, when the TIP voltage is greater than the voltage on capacitor 90 of DRC network 84, current flows through diode 92 of DRC network 84 to charge capacitor 90. When the TIP voltage is less than the voltage on a capacitor 90 of DRC network 84, a diode 92 of DRC network 84 is reverse biased and blocks current flow from capacitor 90 to TIP lead 8. However, the charge on capacitor 90 discharges through a resistor 94 of DRC network 84. Hence, DRC network 84 shunts current away from differential amplifier 76 during peak voltage conditions.

TIP lead 8 is connected to the differential amplifier 76 which includes a parallel biasing network 96 having a first left leg 98 having in series from TIP lead 8 to isolated ground 20 a 200 ohm resistor 100, an inductor 102, diode-connected transistor 88 and a second right leg 104, in parallel with first leg 98, having in series from TIP lead 8 to RING lead 10 a 200 ohm resistor 106 and diode-connected transistor 88'. The parallel combination of 200 ohm resistors 100 and 106 in first and second legs 98 and 104 coact to form a 100 ohm input impedance of differential amplifier 76 which limits current flow therethrough and provides a matching termination resistance.

Diode-connected transistors 88 and 88' perform a logarithm function on the current flowing through first leg 98 and second leg 104, respectively. Specifically, the voltage developed across each diode-connected transistor 88 and 88' is the logarithm of the current flowing therethrough. This increases the dynamic range of differential amplifier 76 since large increases in the currents flowing through each diode-connected transistor 88 and 88' generate relatively small voltage changes.

Differential amplifier 76 includes a discrete differential amplifier 108 connected to parallel biasing network 96. Discrete differential amplifier 108 has an emitter follower output 110 which prevents loading and subsequent gain changes of discrete differential amplifier 108. Preferably, a DC voltage applied to TIP lead 8 causes discrete differential amplifier 108 to output zero volts since equal currents flow in each leg 98 and 104 of parallel biasing network 96. In contrast, in response to a changing voltage on TIP lead 8, inductor 102 in first leg 98 of parallel biasing network 96 produces a voltage difference between legs 98 and 104 of parallel biasing network 96, with the voltage across inductor 102 corresponding to the rate of change of current therethrough according to the well-known equation V=Ldi/dt. Discrete differential amplifier 108 amplifies the difference in voltage between first and second legs 98 and 104 of parallel biasing network 96 due to the response of inductor 102 to the changing voltage on TIP lead 8 and rejects any voltage changes that occur across both diode-connected transistors 88 and 88'. Preferably, inductor 102 is most sensitive to the frequency of BT pulse 32.

It has been observed that when line clamp 6 connects TIP lead 8 and RING lead 10 together through the 100 ohm input impedance of parallel biasing network 96, the charge stored on line capacitor 16 generates discharge pulse 22 which in turn generates EOL pulse 28 and/or BT pulse 32. In operation, leading edge 24 of discharge pulse 22 generates a very high di/dt which is easily sensed by discrete differential amplifier 108. Back-to-back diodes 112 in parallel with inductor 102 of first leg 98 of parallel biasing network 96 limit the maximum voltage received by discrete differential amplifier 108 to avoid damage thereto.

Preferably, equal currents flow in each leg 98 and 104 of parallel biasing network 96 when the voltage of discharge pulse 22 is decaying. To this end, the inductance of inductor 102 is selected as a compromise between having inductor 102 relatively insensitive to the decay of discharge pulse 22 and relatively sensitive to leading edge 24 of discharge pulse 22, EOL pulse 28 and/or BT pulse 32. Fortunately, as discussed above, the decay of discharge pulse 22 has a substantially lower frequency than leading edge 24 of discharge pulse 22, EOL pulse 28 and/or BT pulse 32.

As shown in FIG. 1B, BT 30 connected to trunk line 12 generates BT pulse 32 during decay of discharge pulse 22. It has been empirically determined that the frequency spectrums of EOL pulse 28 and BT pulse 32 are much higher than the frequency spectrum of the line decay. Hence, EOL pulse 28 and BT pulse 32 are easily detected.

Discrete differential amplifier 108 has outputs connected to an input of a first stage unity gain operational amplifier 114 having an output connected to isolation transformer 78. Isolation transformer 78 preferably includes a leakage inductance configured to coact with the input impedance of a second stage operational amplifier 116 to form therewith a single-pole low pass L-R filter which filters high frequency noise received by discrete differential amplifier 108. A diode biasing network 118 connected between an output of isolation transformer 78 and an input of second stage operational amplifier 116 limits the voltage received thereat and, hence, the voltage received at the input of PREAMP/ADC 52. In response to receiving a signal from isolation transformer 78, second stage operational amplifier 116 generates the analog return signal which is supplied to the input of PREAMP/ADC 52. Second relay 82 selectively connects capacitors 86 and 89 in parallel to form with the input/output resistance of PREAMP/ADC 52 a single-pole high pass R-C filter having a desired resonant frequency.

PREAMP/ADC 52 provides controlled amplification for the analog return signal and converts the analog return signal to the digital return data which is sent to DSP 44 via PLD 46 for processing and conversion into an indication of the length of trunk line 12, the position of BTs 30 on trunk line 12 and/or the length of BTs 30 connected to trunk line 12.

DLTDR 2 described herein has the following benefits over the apparatus that perform traditional TDR: simple circuit configuration; slowly charging line capacitor 16 eliminates dynamic response therefrom; variable control of the voltage to which line capacitor 16 is charged; no power loss in return detector 18 during charging of line capacitor 16; improved SNR due to high charge levels of line capacitor 16; and the parameters of trunk line 12 and BTs 30 control EOL pulse 28 and/or BT pulse 32.

The invention has been described with reference to the preferred embodiment. Obvious modifications and alterations will occur to others upon reading and understanding the preceding description. It is intended that the invention be construed as including all such modifications and alterations insofar as they come within the scope of the appended claims or the equivalents thereof.

I claim:

1. A delay-line time-domain reflectometer comprising:
   a charge generator for selectively charging a line capacitor formed by the physical relation of at least two electrically conductive leads to a predetermined DC voltage;
   a line clamp for selectively connecting the leads together; and
   a return detector for receiving a discharge pulse produced by discharge of the line capacitor in response to the line clamp connecting the leads together, for detecting an end-of-line (EOL) pulse superimposed on the discharge pulse or an EOL pulse and a bridged-tap (BT) pulse superimposed on the discharge pulse and for outputting an analog return signal that is a function of the discharge pulse, the EOL pulse and/or the BT pulse, wherein the EOL pulse is produced by interaction between the discharge pulse and a terminal end of the leads and the BT pulse is produced by interaction between the discharge pulse and a BT connected to the leads.

2. The delay-line time-domain reflectometer as set forth in claim 1, wherein the charge generator charges the line capacitor as a function of the length of the conductive leads.

3. The delay-line time-domain reflectometer as set forth in claim 1, further including a charging resistor for limiting a charging current utilized to charge the line capacitor.

4. The delay-line time-domain reflectometer as set forth in claim 1, further including a controller for selectively controlling the operation of the charge generator and the line clamp to charge the line capacitor to a predetermined DC voltage and to connect the leads together, respectively, and for processing the analog return signal to determine a distance between the delay-line time-domain reflectometer and a terminal end of the leads, a distance between the delay-line time-domain reflectometer and a BT and/or a distance between a terminal end of the BT and its connection to the leads.

5. The delay-line time-domain reflectometer as set forth in claim 4, further including:
   a digital-to-analog converter (DAC) for receiving and converting digital waveform data into an analog signal which is supplied to the charge generator for use thereby to charge the line capacitor; and
   an analog-to-digital converter (ADC) for converting the analog return signal into digital return data, wherein the controller supplies the digital waveform data to the DAC and receives the digital return data from the ADC.

6. The delay-line time-domain reflectometer as set forth in claim 5, wherein the controller includes:
   a programmable logic device (PLD) responsive to a control request signal for supplying the digital waveform data to the DAC and for generating one or more control signals which control the operation of the DAC and the ADC;

a digital signal processor (DSP) connected for supplying the control request signal to the PLD and for receiving the digital return data from the ADC; and a host processor for supplying to the DSP a test request and for receiving from the DSP a test result which is a function of the digital return data.

7. The delay-line time-domain reflectometer as set forth in claim 6, further including a rail supply connected to receive DC power from an external source thereof and to convert the received DC power into one or more electrical potentials for use by the return detector, with the rail supply configured to isolate the return detector from the external source of DC power during receipt of the discharge pulse by the return detector.

8. A method of time-domain reflectometry on a pair of electrically conductive leads of a telephone line, the method comprising the steps of:

(a) charging a line capacitor formed by the physical relation of electrically conductive leads of a telephone line to a predetermined DC voltage;

(b) connecting the leads together;

(c) receiving a discharge pulse produced by a discharge of the line capacitor in response to connecting the leads together;

(d) detecting an end-of-line (EOL) pulse superimposed on the discharge pulse or an EOL pulse and a bridged-tap (BT) pulse superimposed on the discharge pulse, where the EOL pulse is produced by interaction between the discharge pulse and a terminal end of the leads and the BT pulse is produced by interaction between the discharge pulse and a BT connected to the leads; and (e) determining from the discharge pulse, the EOL pulse and/or the BT pulse a location of terminal ends of the leads, a location of the BT connection to the leads and/or a location of a terminal end of the BT relative to its connection to the leads.

9. The method as set forth in claim 8, wherein step (e) includes the steps of:

producing an analog return signal as a function of the discharge pulse, the EOL pulse and/or the BT pulse;

converting the analog return signal into digital return data; and determining from the digital return data the location of terminal ends of the leads, the location of the BT connection to the leads and/or the location of a terminal end of the BT relative to its connection to the leads.

10. An apparatus for testing a telephone line, the apparatus comprising:

a charge generator for charging the telephone line to a predetermined DC voltage;

a switch for connecting together leads of the telephone line when the telephone line is charged to the predetermined DC voltage;

a return detector for processing a discharge pulse on the telephone line to produce a return signal, with the discharge pulse produced in response to the switch connecting the leads of the telephone line together when the line capacitor is charged to the predetermined DC voltage; and a means for processing the return signal to determine one or more characteristics of the telephone line.

11. The apparatus as set forth in claim 10, wherein the means for processing includes:

a first converter for converting the return signal into return data; and a controller for processing the return data to determine the one or more characteristics of the telephone line.

12. The apparatus as set forth in claim 10, wherein the one or more characteristics of the telephone line include a length of the telephone line, the location of a BT connection to the telephone line and/or a length of the BT relative to its connection to the telephone line.

13. The apparatus as set forth in claim 10, wherein the telephone line is charged to a plurality of predetermined DC voltages related to the section of the telephone line being tested.

14. The apparatus as set forth in claim 11, wherein the controller synchronizes the operation of the charge generator and the switch to charge the line capacitor and to connect the leads together, respectively.

15. The apparatus as set forth in claim 11, further including a second converter for converting waveform data into a signal which is utilized to control the charge generator to charge the telephone line, wherein the controller supplies the waveform data to the second converter.

16. The apparatus as set forth in claim 15, wherein the controller includes:

a host processor for generating a test request;

a digital signal processor (DSP) for generating a control request and for processing the return data to produce a test result in response to receiving the test request;

a programmable logic device (PLD) for supplying the waveform data and for generating one or more control signals which control the operation of the first converter and the second converter in response to receiving the control request, wherein the host processor processes the test result to determine the one or more characteristics of the telephone line.

17. The apparatus as set forth in claim 11, further including a rail supply for receiving a binary control signal from the controller, for receiving electrical power from a source of electrical power and for supplying operating power to the return detector, wherein the rail supply electrically connects/isolates the return detector to/from the source of electrical power as a function of the state of the binary control signal.

* * * * *

UNITED STATES PATENT AND TRADEMARK OFFICE
CERTIFICATE OF CORRECTION

PATENT NO.   : 6,531,879 B1
DATED        : March 11, 2003
INVENTOR(S)  : Nero, Jr.

It is certified that error appears in the above-identified patent and that said Letters Patent is hereby corrected as shown below:

Column 4,
Line 14, "generator 4 and TP" should read -- generator 4 and TIP --.

Column 5,
Line 12, after "More specifically" delete semicolon and insert comma (,).

Column 6,
Line 15, "DACIPWR" should read -- DAC/PWR --.

Column 7,
Line 67 "UP lead 8" should read -- TIP lead 8 --.

Signed and Sealed this

Eighth Day of July, 2003

JAMES E. ROGAN
*Director of the United States Patent and Trademark Office*